United States Patent
Ahn et al.

(10) Patent No.: US 11,750,367 B2
(45) Date of Patent: Sep. 5, 2023

(54) SIMULATION DEVICE AND METHOD FOR HOMOMORPHIC CRYPTOSYSTEM

(71) Applicant: CRYPTO LAB INC., Seoul (KR)

(72) Inventors: Hoseop Ahn, Yongin-si (KR); Sumin Lee, Seoul (KR)

(73) Assignee: CRYPTO LAB INC., Seoul (KR)

(*) Notice: Subject to any disclaimer, the term of this patent is extended or adjusted under 35 U.S.C. 154(b) by 0 days.

(21) Appl. No.: 17/785,235

(22) PCT Filed: Jun. 15, 2021

(86) PCT No.: PCT/KR2021/007512
§ 371 (c)(1),
(2) Date: Jun. 14, 2022

(87) PCT Pub. No.: WO2021/256841
PCT Pub. Date: Dec. 23, 2021

(65) Prior Publication Data
US 2023/0008949 A1 Jan. 12, 2023

(30) Foreign Application Priority Data

Jun. 15, 2020 (KR) .................. 10-2020-0072575
Jun. 14, 2021 (KR) .................. 10-2021-0076736

(51) Int. Cl.
*H04L 9/00* (2022.01)

(52) U.S. Cl.
CPC .......... *H04L 9/008* (2013.01); *H04L 2209/26* (2013.01)

(58) Field of Classification Search
CPC .... H04L 9/008; H04L 2209/26; H04L 9/0618
See application file for complete search history.

(56) References Cited

U.S. PATENT DOCUMENTS

| | | | |
|---|---|---|---|
| 7,480,383 | B2 | 1/2009 | Cho et al. |
| 10,211,974 | B2 | 2/2019 | Seo et al. |
| 2005/0135617 | A1 | 6/2005 | Cho et al. |
| 2015/0312031 | A1 | 10/2015 | Seo et al. |
| 2017/0103227 | A1* | 4/2017 | Kerschbaum ........... H04L 9/008 |

(Continued)

FOREIGN PATENT DOCUMENTS

| | | |
|---|---|---|
| KR | 20050064289 A | 6/2005 |
| KR | 20150122513 A | 11/2015 |
| KR | 20200054117 A | 5/2020 |

OTHER PUBLICATIONS

Ahmad et al., Homomorphic Encryption Method Applied to Cloud Computing, International Journal of Information & Computation Technology. ISSN 0974-2239 vol. 4, No. 15 (2014), pp. 1519-1530 (Year: 2014).*

(Continued)

*Primary Examiner* — Meng Li
(74) *Attorney, Agent, or Firm* — Steinfl + Bruno LLP

(57) ABSTRACT

An electronic device is disclosed. The electronic device comprises: a memory for storing at least one instruction; and a processor for executing at least one instruction, wherein the processor executes the at least one instruction so as to, when an operation command for a homomorphic ciphertext is input, obtain an operation result by using a plaintext operation corresponding to the operation command and a plaintext corresponding to the homomorphic ciphertext, and output the obtained operation result in a manner corresponding to the operation command.

10 Claims, 5 Drawing Sheets

(56) References Cited

U.S. PATENT DOCUMENTS

| | | | | |
|---|---|---|---|---|
| 2017/0147835 | A1* | 5/2017 | Bacon | H04L 9/008 |
| 2018/0048459 | A1 | 2/2018 | Ding | |
| 2018/0294951 | A1* | 10/2018 | Paz de Araujo | H04L 9/0891 |
| 2018/0349740 | A1* | 12/2018 | Schneider | G06F 17/18 |
| 2019/0229887 | A1 | 7/2019 | Ding et al. | |
| 2020/0374101 | A1* | 11/2020 | Hoshizuki | H04L 9/0618 |
| 2021/0203474 | A1* | 7/2021 | Kim | G06F 17/17 |
| 2021/0297232 | A1* | 9/2021 | Kim | H04L 9/0618 |
| 2021/0344479 | A1* | 11/2021 | Lee | H04L 9/3093 |
| 2021/0376998 | A1* | 12/2021 | No | G06F 16/319 |

OTHER PUBLICATIONS

Korean Office Action for Korean Application No. 10-2021-0076736 filed on Jun. 14, 2021 on behalf of Crypto Lab Inc, dated Aug. 17, 2022 10 pages (English + Original).

LG CNS, "4th generation encryption, what is fully homomorphic encryption?" https://blog.lgcns.com/2045 (Jul. 16, 2019) 13 pages (English + Original).

Decision to Grant issued with allowed claims for KR Application No. 10-2021-6676736 filed on Jun. 14, 2021 on behalf of Crypto Lab Inc, dated Dec. 1, 2022. English and original. 8 pages.

Ahmad, Iram, et al., "Homomorphic Encryption Method Applied to Cloud Computing," *International Journal of Information & Computation Technology*. ISSN 0974-2239, vol. 4, No. 15. 2014. pp. 1519-1530. 12 Pages.

International Search Report for International PCT Application No. PCT/KR2021/007512 filed on Jun. 15, 2021, on behalf of Crypto Lab Inc, dated Sep. 28, 2021. 5 Pages. KR Original + English Translation.

Wang, Wenhao, et al., "Toward Scalable Fully Homomorphic Encryption Through Light Trusted Computing Assistance," arXiv:1905.07766v1. pp. 1-12, May 19, 2019. 13 Pages.

Written Opinion for International PCT Application No. PCT/KR2021/007512 filed on Jun. 15, 2021, on behalf of Crypto Lab Inc, dated Sep. 28, 2021. 10 Pages. KR Original + English Translation.

* cited by examiner

FIG. 4

```
pyHEAAN
├─ heaan_mock.py        # operation for cipher text (mockup of binary HEAAN) ──410
├─ heaan_utils_mock.py  # operation for ctxt tableobject (mockup of heaan_utils) ──420
├─ heaan_mock_unittest.py
├─ heaan_utils_mock_unittest.py
└─ tests                # ALGORITHM TEST OF DEVELOPER/USER
    ├─ test1.py
    ├─ test2.py
    └─ ....
```

400

SIMULATION DEVICE AND METHOD FOR HOMOMORPHIC CRYPTOSYSTEM

CROSS REFERENCE TO RELATED APPLICATIONS

The present application is the U.S. national stage of International Application No. PCT/KR2021/007512 filed on Jun. 15, 2021, which, in turn, claims priority to Korean Application No. 10-2020-0072575 filed on Jun. 15, 2020, and Korean Application No. 10-2021-0076736 filed on Jun. 14, 2021.

TECHNICAL FIELD

This disclosure relates to a simulation apparatus for a homomorphic encryption system and a method thereof, and more particularly, to a simulation apparatus and a method capable of verifying a homomorphic encryption system at a high speed.

BACKGROUND ART

Development of electronic and communication technology enables various services that transmit and receive data between various devices. As an example, a cloud computing service by which a user stores personal information in a server and uses information in the server is actively used.

The use of a security technology to prevent data leakage is essential in this environment. Accordingly, a server stores encrypted data. In this case, the server must decrypt the encrypted data whenever it retrieves the stored data or performs a series of tasks based on the data, resulting in waste of resources and time.

When hacking by the third party occurs while the decryption is temporarily performed by the server for operation, the personal information may be easily leaked to the third party.

In order to solve this problem, a homomorphic encryption method has been studied. Using the homomorphic encryption scheme, even if the operation is performed in the encrypted ciphertext without decrypting the encrypted information, it is possible to obtain the same result as the encryption value after computing a plaintext. Therefore, various operations may be performed in a state where the ciphertext is not decrypted.

In that the homomorphic encryption may be performed in an encrypted state as described above, the homomorphic encryption may be applied to various environments requiring encryption, but not only a program technology but also understanding of a homomorphic encryption is necessary to develop a homomorphic encryption program that operates in this environment and thus, development has not been easy. In addition, there is a need for a homomorphic encryption simulator that may operate in various computing environments in that different developments are required for each platform.

DISCLOSURE

Technical Problem

It is an object of the disclosure to address the above-mentioned problems, and provide a simulation apparatus capable of verifying a homomorphic encryption system at a high speed and a method thereof.

Technical Solution

An electronic apparatus according to an embodiment includes a memory storing at least one instruction and a processor to execute the at least one instruction, and the processor, by performing the at least one instruction, is to, based on receiving an operation command for a homomorphic ciphertext, calculate an operation result using a plaintext corresponding to the homomorphic ciphertext and plaintext operation corresponding to the operation command, and output the calculated operation result in a scheme corresponding to the operation command.

The processor may predict an operation amount corresponding to the operation command for the homomorphic ciphertext and output the predicted operation amount.

The processor may determine whether rebooting is necessary in a homomorphic operation process according to the operation command, and based on determination that the rebooting is necessary, predict an operation amount corresponding to the operation command in consideration of an operation amount necessary for rebooting.

The memory may store operation capability information of the electronic apparatus, and the processor may calculate time required for performing the operation command using the operation capability information and the predicted operation amount.

The processor may encrypt the operation result in a homomorphic encryption scheme and output the encrypted output result in a scheme corresponding to the operation command.

The operation command may include at least one of a homomorphic addition for a plurality of homomorphic ciphertexts, a homomorphic multiplication for a plurality of homomorphic ciphertexts, rotation for one homomorphic ciphertext, or rebooting for one homomorphic ciphertext.

The electronic apparatus may further include a display, and the processor, based on an output scheme corresponding to the operation command being displaying, may control the display to display the operation result.

The electronic apparatus may further include a communication device, and the processor may, based on the output scheme corresponding to the operation command being transmitting to an external device, control the communication device to transmit the operation result to the external device.

The processor may, based on the output scheme corresponding to the operation command being outputting to another application program, input the operation result to the another application program.

A method of simulation for a ciphertext by an electronic apparatus includes receiving an operation command for a homomorphic ciphertext; calculating an operation result using a plaintext corresponding to the homomorphic ciphertext and plaintext operation corresponding to the operation command; and outputting the calculated operation result in a scheme corresponding to the operation command.

The method may further include predicting an operation amount corresponding to the operation command for the homomorphic ciphertext and outputting the predicted operation amount.

The predicting the operation amount may include determining whether rebooting is necessary in a homomorphic operation process according to the operation command, and based on determination that the rebooting is necessary, predicting an operation amount corresponding to the operation command in consideration of an operation amount necessary for rebooting.

The method may further include predicting an operation amount corresponding to the operation command for the homomorphic ciphertext and outputting the predicted operation amount.

The method may further include calculating and outputting time required for performing the operation command using prestored operation capability information of the electronic apparatus and the predicted operation amount.

The method may further include encrypting the operation result in a homomorphic encryption scheme, and the outputting comprises outputting the encrypted output result in a scheme corresponding to the operation command.

Effect of Invention

According to various embodiments of the disclosure as described above, validity and time complexity of an algorithm to be applied to a homomorphic encryption system may be tested in a fast manner.

DESCRIPTION OF DRAWINGS

FIG. 4 is a diagram illustrating a structure of a simulation module according to an embodiment of the disclosure.

MODE FOR CARRYING OUT THE INVENTION

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector and a polynomial.

The mathematical operation and operation of each step of the disclosure described hereinafter may be realized by a computer operation by a coding method known for corresponding operation or operation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.

a←D: element (a) is selected according to distribution (D)

$s_1$, $s_2 \in R$: S1 and S2 are each an element belonging to R set.

mod (q): Modular operation with q elements $\lfloor \cdot \rceil$: internal value is round off Hereinafter, various embodiments of the disclosure will be described in detail with reference to the accompanying drawings.

Figure 1:
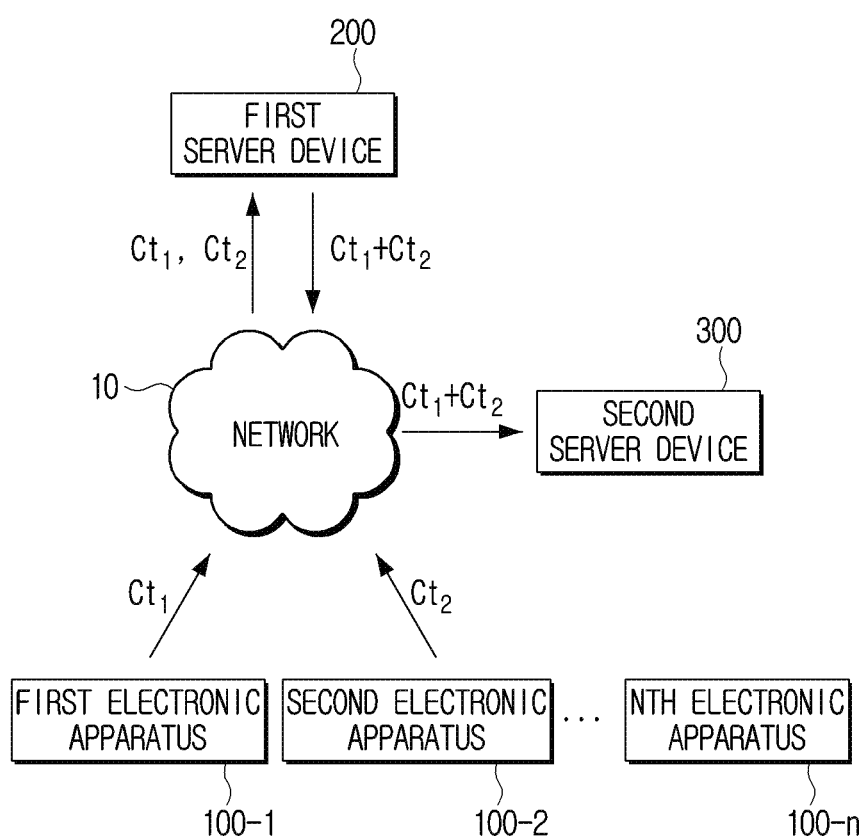
FIG. 1 is a diagram illustrating a structure of a network system according to an embodiment of the disclosure.

FIG. 1 is a view illustrating a structure of a network system according to an embodiment of the disclosure.

Referring to FIG. 1, the network system may include a plurality of electronic apparatuses 100-1 to 100-$n$, a first server device 200, and a second server device 300, and the components each may be connected to each other via a network 10.

The network 10 may be implemented in various types of wired/wireless communication networks, broadcast communication networks, optical communication networks, cloud networks, and the like, and each device may also be connected by a method such as Wi-Fi, Bluetooth, and near field communication (NFC), and the like, without a separate medium.

In FIG. 1, a plurality of electronic apparatuses 100-1 to 100-$n$ are illustrated but the plurality of electronic apparatuses may not necessarily be used and one device may be used. For example, the electronic apparatuses 100-1 to 100-$n$ may be implemented in various types of devices such as smartphones, tablets, game players, PCs, laptop PCs, home servers, kiosks, and the like, and may also be implemented in the form of a home appliance to which an internet of things (IoT) function is applied.

A user may input various information through the electronic apparatuses 100-1 to 100-$n$ which the user is using. The input information may be stored in the electronic apparatuses 100-1 to 100-$n$, but may be transferred to an external device due to the reason of storage capacity, security, or the like. Referring to FIG. 1, the first server device 200 may function to store the information, and the second server device 300 may function to use some or all of the information stored in the first server device 200.

Each of the electronic apparatuses 100-1 to 100-$n$ may homomorphically encrypt the input information, and transfer a homomorphic ciphertext to the first server device 200.

Each of the electronic apparatuses 100-1 to 100-$n$ may include encryption noise calculated in the process of performing the homomorphic encryption, i.e., an error, in the ciphertext. For example, the homomorphic ciphertext generated by each of the electronic apparatuses 100-1 to 100-$n$ may be generated in a form in which a resultant value including a message and an error value is restored, when decrypted later using a secret key.

For example, the homomorphic ciphertext generated by the electronic apparatuses 100-1 to 100-n may be generated in a form satisfying the following properties when decrypted using a secret key.

$$Dec(ct, sk) = <ct, sk> = M + e \pmod{q} \quad \text{[Equation 1]}$$

Here, <, > is a usual inner product, ct is a ciphertext, sk is secret key, M is plaintext message, e is an encryption error value, and mod q is Modulus of the ciphertext. Here, q should be chosen to be greater than a resultant value M obtained by multiplying the message by a scaling factor Δ. If an absolute value of the error value e is smaller enough than M, then a decrypted value M+e of the ciphertext is a value that may replace an original message with the same precision in significant digit operation. Among the decrypted data, an error may be disposed on the least significant bit (LSB) side and M may be disposed on a second LSB side.

If a size of the message is too small or too large, the size of the message may be adjusted using a scaling factor. When the scaling factor is used, even a message in the form of a real number, as well as the form of an integer, may be encrypted, utilization may be significantly increased. In addition, by adjusting the size of the message using the scaling factor, a size of an area in which the messages exist, that is, an effective area, in the ciphertext after the operation is performed may also be adjusted.

According to an embodiment, the ciphertext modulus q may be set and used in various forms. For example, the modulus of the ciphertext may be set in the form of an exponential power $q = \Delta^L$ of the scaling factor Δ. If Δ is 2, q may be set to a value such as $q = 2^{10}$.

As another example, the ciphertext modulus may be set to a value multiplied by a plurality of different scaling factors. Each of the factors may be set to a value within a similar range, that is, a value of a similar size. For example, the factor may be set to $q = q_1 q_2 q_3 \ldots q_x$, each of which may have the similar size with the scaling factor Δ and may be set to a value of a coprime.

When the scaling factor is set in the same manner, the overall operation may be performed by dividing the entire operation into a plurality of modulus operations according to the Chinese remainder theorem (CRT), thereby reducing the operational burden.

In addition, by using a factor of similar sizes, a result of approximately the same as the result value in the previous example may be obtained when rounding processing is performed in the step to be described below.

The first server device 200 may store the received homomorphic ciphertext in the ciphertext form, without decrypting the received homomorphic ciphertext.

The second server device 300 may request a specific processing result for the homomorphic ciphertext from the first server device 200. The first server device 200 may perform a specific operation according to a request from the second server device 300, and then transfer a result to the second server device 300.

For example, when the ciphertexts $ct_1$ and $ct_2$ transferred from the two electronic apparatuses 100-1 and 100-2 are stored in the first server device 200, the second server device 300 may request a value which sums the information provided from two electronic apparatuses 100-1, 100-2 to the first server device 200. The first server device 200 may perform an operation of summing the two ciphertexts according to the request, and then transmit the result value $ct_1 + ct_2$ to the second server device 300.

According to a feature of the homomorphic ciphertext, the first server device 200 may perform an operation in a state that the decryption is not performed, and the result may be a ciphertext form. At this time, the first server device 200 may perform the bootstrapping for the operation result.

The first server device 200 may transmit an operation result ciphertext to the second server device 300. The second server device 300 may decrypt the received operation result ciphertext to obtain an operation result value of the data included in each of the homomorphic ciphertexts. The first server device 200 may perform an operation several times according to a user request.

Meanwhile, although FIG. 1 illustrates a case that the first electronic apparatus and the second electronic apparatus perform encryption and the second server device performs decryption, the disclosure is not limited thereto.

In the description of FIG. 1, it is described that a homomorphic operation is performed in a homomorphic ciphertext state. However, in various environments utilizing the homomorphic operations described above, a lot of time is required to experiment implemented algorithms. For example, in the case of rebooting with respect to a homomorphic ciphertext, a time of 120 seconds is required only with one action, and if various homomorphic operations are combined, a lot of time may be taken for algorithm verification.

Accordingly, in the disclosure, a simulator necessary for the development of the homomorphic ciphertext system is used. In the simulator according to the disclosure, when an operation command for homomorphic ciphertext is inputted, the simulator performs the same operation in a plaintext state corresponding to the homomorphic ciphertext, and outputs the result, instead of performing an operation in the homomorphic ciphertext state. In addition, when a corresponding operation is performed in the actual homomorphic ciphertext state, the operation amount and the processing time may be predicted and outputted. An apparatus for performing the above-described operation may be any apparatus shown in FIG. 1, and for example, application to a first electronic apparatus 100-1 will be described for convenience of description.

Figure 2:
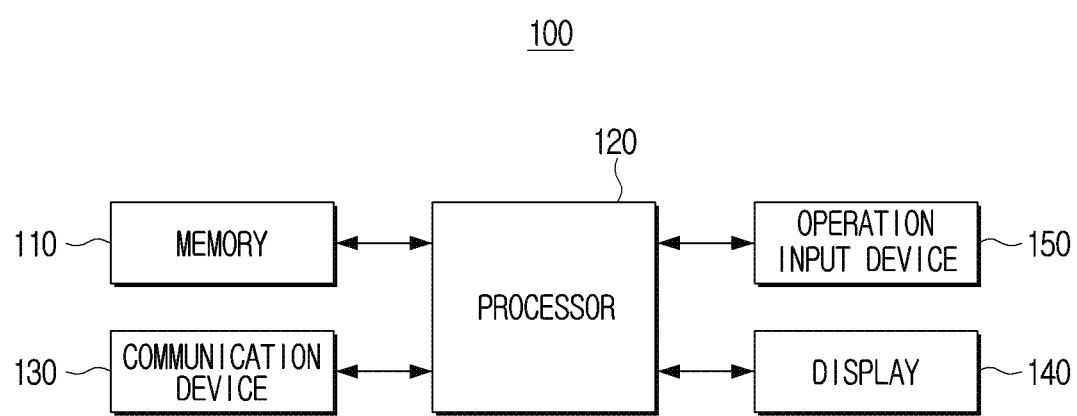
FIG. 2 is a block diagram illustrating a simple configuration of an electronic apparatus according to an embodiment of the disclosure.

FIG. 2 is a block diagram illustrating a configuration of the electronic apparatus according to an embodiment of the disclosure.

Referring to FIG. 2, an electronic apparatus 100 may include a memory 110, a processor 120, a communication device 130, a display 140, and an operation input device 150. The electronic apparatus may be various devices such as a personal computer (PC), a notebook, a smart phone, a tablet, a server, and the like.

At least one instruction related to the electronic apparatus 100 may be stored in the memory 110. For example, the memory 110 may store various programs (or software) for operating the electronic apparatus 100 in accordance with various embodiments of the disclosure.

The memory 110 may be implemented in various forms such as RAM, ROM, buffer, cache, flash memory, HDD, external memory, memory card, etc., but is not limited thereto.

The memory 110 may store a message to be encrypted. Here, the message may be various types of credit information, personal information, etc., and may be information related to usage history such as location information, Internet use time information, etc. used in the electronic apparatus 100.

The memory 110 may store a public key, and when the electronic apparatus 100 generates a public key, it is possible to store various parameters required for generating a public key and a secret key, as well as a secret key.

The memory 110 may store the homomorphic ciphertext generated in the process to be described below. The memory 110 may store the homomorphic ciphertext transmitted from an external device. The memory 110 may store an operation result ciphertext, which is an output of the operation process, which will be described later.

The memory 110 stores operation capability information of the electronic apparatus 110. The operation capability information may be operation performance information that the electronic apparatus may perform per second, or may be hardware specification information constituting the electronic apparatus 110.

When the electronic apparatus 100 operates as a simulator, the memory 110 may store the homomorphic ciphertext and a plaintext corresponding to the homomorphic ciphertext.

The communication device 130 is provided to connect the electronic apparatus 100 to an external device (not shown), and here, the communication device 130 may be connected to an external device via a local area network (LAN) and the internet or may be connected to the external device through a universal serial bus (USB) port or a wireless communication (e.g., Wi-Fi 802.11a/b/g/n, NFC, Bluetooth) port. The communication device 130 may also be referred to as a transceiver.

The communication device 130 may receive a public key from an external device and transfer a public key generated by the electronic apparatus 100 itself to the external device.

The communication device 130 may receive a message from an external device and transfer a generated homomorphic ciphertext or the operation result to the external device.

In addition, the communication device 130 may receive various parameters necessary for generating a ciphertext from an external device. Meanwhile, in the implementation, various parameters may be directly input from the user through the operation input device 150 to be described later.

In addition, the communication device 130 may receive a request for an operation on the homomorphic ciphertext from the external device and transfer a calculated result to the external device. The requested operation may be, for example, operation such as addition, subtraction, multiplication (e.g., a modular multiplication operation). Here, the modular multiplication operation refers to modular operation with q element.

The display 140 displays a user interface window for selecting a function supported by the electronic apparatus 100. For example, the display 140 may display a user interface window for selecting various functions provided by the electronic apparatus 100. The display 140 may be a monitor such as a liquid crystal display (LCD), an organic light emitting diode (OLED), or the like or may be implemented as a touch screen capable of simultaneously performing a function of the operation input device 150 to be described later.

The display 140 may display a message requesting input of a parameter required for generating a secret key and a public key. The display 140 may display a message for selecting a message by an encryption target. Meanwhile, when implemented, the encryption target may be directly selected by the user or may be automatically selected. That is, personal information requiring encryption may be automatically set even if the user does not directly select a message.

The display 140 may display an operation result. For example, if the output scheme for the homomorphic ciphertext is a screen display, the display 140 may display an operation result.

The operation input device 150 may receive selection of a function of the electronic apparatus 100 and a control command for the corresponding function from the user. For example, the operation input device 150 may receive a parameter required for generating a secret key and a public key from the user. In addition, the operation input device 150 may receive a message to be encrypted from the user.

The processor 120 controls an overall operation of the electronic apparatus 100. For example, the processor 120 may control the overall operation of the electronic apparatus 100 by executing at least one instruction stored in the memory 110. The processor 120 may be configured as a single device such as a central processing unit (CPU) or an application-specific integrated circuit (ASIC) or may include a plurality of devices such as the CPU and a graphics processing unit (GPU).

The electronic apparatus 100 according to the disclosure may perform general homomorphic operation processing as described with respect to FIG. 1, or perform a function as a simulator. Hereinbelow, an operation of a general homomorphic operation process will be described first and a function as a simulator will be described later.

When a message to be transferred is input, the processor 120 may store the message in the memory 110. The processor 120 may homomorphically encrypt the message using various set values and programs stored in the memory 110. In this case, the public key may be used.

The processor 120 may generate a public key required for performing encryption by itself and use the public key or may receive the public key from an external device and use the same. For example, the second server device 300 that performs decryption may distribute the public key to other devices.

When generating a key by itself, the processor 120 may generate the public key using a Ring-LWE technique. For example, the processor 120 may first set various parameters and rings and store the set parameters and rings in the memory 110. Examples of parameters may include a length of bits of a plaintext, sizes of the public key and the secret key, and the like. Examples of various parameters used in the disclosure and the values will be described in detail in FIG. 4.

The ring may be expressed by the following equation 2.

$$R = \frac{Z_q[X]}{f(x)} \quad \text{[Equation 2]}$$

Here, R denotes a ring, Zq denotes a coefficient, and f(x) is a $n^{th}$ order polynomial.

The ring, as a set of polynomials with predetermined coefficients, refers to set in which addition and multiplication are defined between elements and which is closed for addition and multiplication. Such a ring may be referred to as a circle.

As an example, the ring refers to a set of N-th polynomials whose coefficient is Zq. For example, the ring may refer to N-th cyclotomic polynomial when n is Φ(N). Here, (f(x)) denotes an ideal of Zq[x] produced by (x). The Euler's totient function Φ(N) refers to the number of natural numbers which are relatively prime with N and smaller than N. If $\Phi_N(x)$ is defined as the N-th cyclotomic polynomial, the ring may also be expressed as Equation 3 below. Here, for N, $2^{17}$ may be used.

$$R = \frac{Z_q\lfloor X \rfloor}{\Phi_N(x)} \quad \text{[Equation 3]}$$

The secret key sk may be represented as shown below.

Meanwhile, the ring of Equation 3 described above has a complex number in a plaintext space. In order to improve an operation speed for the homomorphic ciphertext, only a set in which the plaintext space is a real number, in the set of the ring described above, may also be used.

When such a ring is established, the processor 120 may calculate a secret key sk from the ring.

$$sk \leftarrow (1, s(x)), s(x) \in R \quad \text{[Equation 4]}$$

Here, s(x) denotes a polynomial generated randomly with a small coefficient.

The processor 120 may calculate a first random polynomial a(x) from the ring. The first random polynomial may be expressed as follows.

$$a(x) \leftarrow R \quad \text{[Equation 5]}$$

In addition, the processor 120 may calculate an error. For example, the processor 120 may extract an error from a discrete Gaussian distribution or a distribution having a statistical distance close thereto. This error may be expressed as follows.

$$e(x) \leftarrow D^n_{\alpha q} \quad \text{[Equation 6]}$$

When the error is calculated, the processor 120 may calculate a second random polynomial by performing a modular operation on the first random polynomial and the secret key error. The second random polynomial may be expressed as follows.

$$b(x) = -a(x)s(x) + e(x) \pmod{q} \quad \text{[Equation 47]}$$

Finally, the public key pk is set in a form including the first random polynomial and the second random polynomial as follows.

$$pk = (b(x), a(x)) \quad \text{[Equation 8]}$$

The method of generating the key described above is merely an example, and thus the disclosure is not limited there and the public key and the secret key may be generated in other ways.

When the public key is generated, the processor 120 may control the communication device 130 to transfer the public key to other devices.

The processor 120 may generate a homomorphic ciphertext for a message. For example, the processor 120 may generate the homomorphic ciphertext by applying the previously generated public key to the message.

A message to be decrypted may be received from an external source or may be input from an input device directly coupled or connected to the electronic apparatus 100. For example, when the electronic apparatus 100 includes a touch screen or a key pad, the processor 120 may store data input through the touch screen or the key pad in the memory 110, and then encrypt the data. The generated homomorphic ciphertext may be restored to a result value obtained by adding an error to a value reflecting the scaling factor in the message when the code is decrypted. The scaling factor may use a value which has been input and set previously, as it is.

Alternatively, the processor 120 may encrypt the message and the scaling factor, in a multiplied state, directly using the public key. In this case, an error calculated in the encryption process may be added to the result value obtained by multiplying the message and the scaling factor.

The processor 120 may also generate the length of the ciphertext to correspond to the size of the scaling factor.

When the homomorphic ciphertext is generated, the processor 120 may control the communication device 130 to store the generated ciphertext in the memory 110 or transfer the ciphertext to another device according to a user request or a predetermined default command.

According to an embodiment of the disclosure, packing may be performed. The use of packing in homomorphic encryption makes it possible to encrypt multiple messages in a single ciphertext. In this case, when an operation is performed between the ciphertexts in the electronic apparatus 100, an operation burden is significantly reduced because the operation is performed on a plurality of messages in parallel.

For example, when a message includes a plurality of message vectors, the processor 120 may convert the plurality of message vectors into a polynomial that may be encrypted in parallel and then the processor 120 may multiply the polynomial by a scaling factor, and perform homomorphic encryption thereon using a public key. The processor 120 may generate a ciphertext which packs a plurality of message vectors.

When the homomorphic ciphertext is required to be decrypted, the processor 120 may generate a polynomial deciphertext by applying a secret key to the homomorphic ciphertext and generate a message by decoding the polynomial deciphertext. ere, the generated message may include an error as mentioned in Equation 1 described above.

The processor 120 may perform an operation on the ciphertext. For example, the processor 120 may perform an operation such as addition, subtraction, or multiplication, while maintaining the encrypted state regarding the homomorphic ciphertext.

If the operation is complicated, the electronic apparatus 100 may detect data of a valid area from operation result data. For example, the electronic apparatus 100 may perform a rounding process on the operation result data to detect data of a valid area.

Here, the rounding process refers to round-off of a message in an encrypted state. Alternatively, the rounding process may also be referred to as rescaling. For example, the electronic apparatus 100 may multiply the components of each of the ciphertexts by $\Delta-1$, which is the inverse of the scaling factor, and round off, thereby removing the noise area. The noise area may be determined to correspond to the size of the scaling factor. As a result, a message of an effective area excluding the noise area may be detected. The process is proceeded in the encryption state and an additional error may occur, but it is negligible since the size is sufficiently small.

The rounding process described above may be used for modular multiplication operations as described above.

The electronic apparatus 100 may extend the plaintext space of the ciphertext of the operation as a result of the operation if the approximate message percentage in the ciphertext exceeds a threshold. For example, if q is smaller than M in Equation 1 above, M+e (mod q) has a value different from M+e, so that decryption becomes impossible. Thus, the q value should always be maintained greater than M. However, as the operation proceeds, the q value gradually decreases. The extension of the plaintext space means changing the ciphertext ct to a ciphertext having a greater modulus. An operation of extending the plaintext space may alternatively be referred to as rebooting. As the rebooting is performed, the ciphertext may be in a state that operation becomes possible again.

The processor 120 may perform an operation on the homomorphic ciphertext as described above in a homomorphic ciphertext state, but also may perform the operation in a simulation method. Hereinafter, the operation of the processor 120 in a simulation method will be described.

When the processor 120 receives a mathematical operation processing command for the homomorphic ciphertext, the processor 120 may perform a corresponding operation processing command in a plaintext state. For example, if the corresponding operation processing command is a homomorphic addition command for the two homomorphic ciphertext, the processor 120 may perform an addition operation using a plaintext corresponding to each of the two homomorphic ciphertext.

At this time, if the plaintext for the corresponding homomorphic ciphertext is not stored in the memory 110, the processor 120 may decrypt the homomorphic ciphertext to generate a plaintext, and perform an operation using the generated plaintext.

The processor 120 may calculate the amount of operation required for the corresponding homomorphic operation. For example, if the requested operation processing is composed of two times of homomorphic addition and one time of homomorphic multiplication, the total amount of operation may be calculated by summing the amount of operation required for the addition operation for the homomorphic ciphertext and the amount of operation required for homomorphic multiplication.

The processor 120 may determine whether rebooting is necessary during a homomorphic operation process according to the operation command, and may predict an operation amount corresponding to the operation command in consideration of the amount of operation required for rebooting when it is determined that the rebooting is required.

For example, rebooting is an operation requiring a lot of time, but if a predetermined number or more of operations of the homomorphic ciphertext are performed, the internal error may be increased so that no more operation is possible. Accordingly, the processor 120 may predict the error size in the requested operation processing, and may determine that rebooting is required if the predicted error size indicates that it is a situation that rebooting is necessary. If it is determined that rebooting is required, a final operation amount may be calculated by reflecting the amount of operation required for rebooting when calculating the amount of operation described above.

It has been described that the size of error is predicted to determine whether a rebooting operation is required, but it is also possible to identify whether the rebooting operation is necessary and calculate the necessary number of rebooting operations based on whether an operation such as a homomorphic multiplication that may increase error a lot is included, and how many times the operation like homomorphic multiplication is performed.

The processor 120 may calculate the processing time required to perform the calculated operation amount using the resource information.

When the operation is completed, the processor 120 may output the operation result in a manner corresponding to the operation command. For example, if the output scheme corresponding to the operation command is displaying, the processor 120 may control the display 140 to display the result of operation. If the output method corresponding to the operation command is transmitting to the external device, the processor 120 may control the communication device 130 to transmit the operation result to the external device. If the output scheme corresponding to the operation command is output to another application program, the processor 120 may input the operation result to another application program.

The processor 120 may change the operation result to an output format corresponding to the operation command and output the result. For example, if the output format corresponding to the operation command is a homomorphic ciphertext, the processor 120 may encrypt the operation result in the message state using an algorithm as described above, and output the encrypted operation result. In addition, the processor 120 may perform an operation of converting a corresponding operation result into a file format or a data structure requested by an application program or another device. Through such an operation, the electronic apparatus 100 may operate on various platforms.

Figure 3:
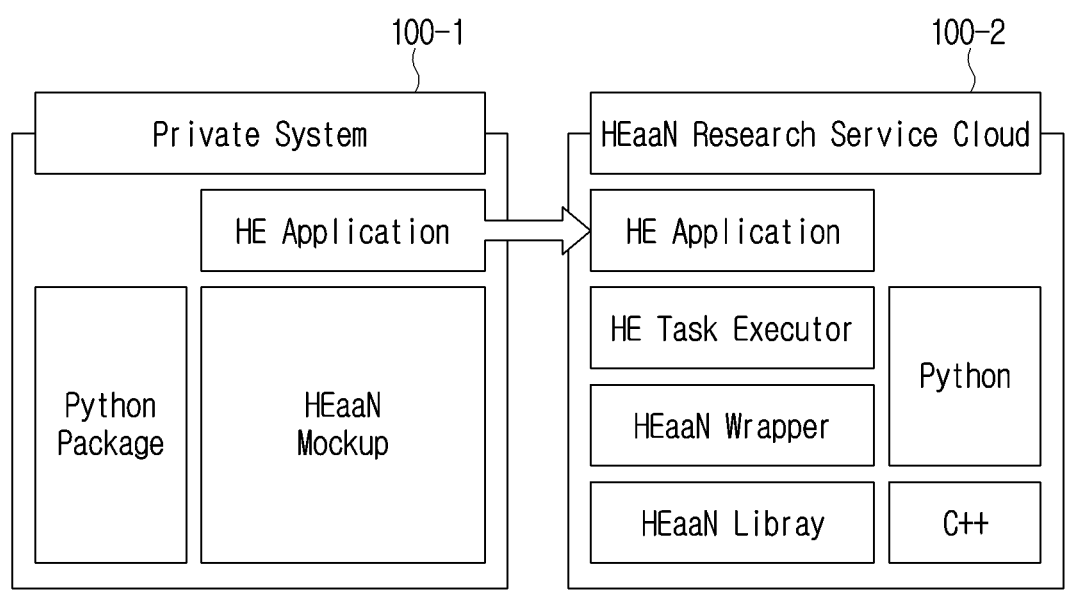
FIG. 3 is a diagram illustrating a case where one of the two electronic apparatuses operates as a simulator.

FIG. 3 is a diagram illustrating a case where one of the two electronic apparatuses operates as a simulator.

Referring to FIG. 3, a first electronic apparatus 100-1 is a device operating as a simulator, and a second electronic apparatus 100-2 is a device for performing a homomorphic encryption operation.

Hereinafter, it is assumed that the first electronic apparatus 100-1 performs a homomorphic multiplication operation on the two homomorphic ciphertext and provides the result to the second electronic apparatus 100-2.

When the simulator is not used, the first electronic apparatus 100-1 may calculate the homomorphic multiplication for the two homomorphic ciphertexts and provide the result to the second electronic apparatus 100-2.

However, if the platforms are different between the two devices, and development of the communication protocol scheme is required than the homomorphic operation process itself, much time should be taken in the test process according to the modification of the communication protocol.

However, when the first electronic apparatus 100-1 operates as a simulator, a rapid operation is possible, and easier development is available.

FIG. 4 is a diagram illustrating a structure of a simulation module according to an embodiment of the disclosure.

Referring to FIG. 4, a simulation module 400 may include a module 410 for performing a simulation operation on the homomorphic ciphertext, and a module 420 for performing a simulation operation on the homomorphic object.

As described above, the module 410 for performing the simulation operation on the homomorphic ciphertext is a mockup module which performs an operation by using a plaintext corresponding to the homomorphic ciphertext, rather than performing an operation on the homomorphic ciphertext in a homomorphic ciphertext state, as described above. The mockup module may calculate an operation amount and a processing time required for performing the operation in a plaintext state as well as in a homomorphic ciphertext state.

The mockup module may have a form operable on various platforms, and may include a function of converting a file format or a data structure into a desired input/output form in various platforms.

Figure 5:
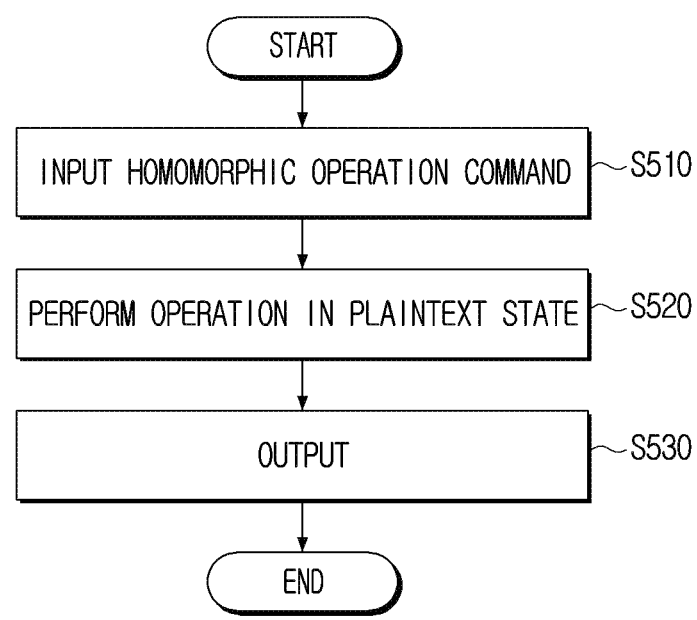
FIG. 5 is a flowchart illustrating a simulation method according to an embodiment of the disclosure.

FIG. 5 is a flowchart illustrating a simulation method according to an embodiment of the disclosure.

Referring to FIG. 5, an operation command for the homomorphic ciphertext is input in operation S510. More specifically, various operation commands supported by a homomorphic encryption system such as homomorphic addition for a plurality of homomorphic ciphertexts, a homomorphic multiplication for a plurality of homomorphic ciphertexts, rotation for one homomorphic ciphertext, and rebooting with respect to one homomorphic ciphertext, or the like.

The operation result may be calculated by using a plaintext corresponding to the homomorphic ciphertext and a plaintext operation corresponding to the operation command in operation S520. More specifically, the operation in the homomorphic ciphertext state requires a lot of operation amounts and processing times, so that a requested operation in a plaintext state corresponding to the homomorphic ciphertext may be performed. For example, when an addition command for a first homomorphic ciphertext and a second homomorphic ciphertext is received, an addition operation may be performed by using a first plaintext and a second plaintext corresponding to each of the first homomorphic ciphertext and the second homomorphic ciphertext. At this time, it is possible to predict an operation amount and/or an operation time required when a corresponding operation command is performed in an actual homomorphic ciphertext state together with the above-described operation.

The calculated operation result is output in a manner corresponding to the operation command in operation S530. In the homomorphic encryption system, various output methods as well as various operations may be supported. There may be a variety of methods, such as not only displaying the result of the operation, but also transmitting an operation result to another external device or delivering an input value of another application program in one device, or the like. Accordingly, it is possible to provide an operation result that has been previously performed by an output method corresponding to a corresponding operation command. If the corresponding output result should be input as the homomorphic ciphertext in another device, the corresponding output result may be encrypted to a homomorphic ciphertext, and the encrypted output result may be output.

The simulation method according to the various embodiments described above may be implemented in the form of a program code for performing each step, and may be stored in a recording medium and distributed. The apparatus in which the recording medium is mounted may perform operations such as encryption or ciphertext processing, simulation, and the like.

Meanwhile, the method of simulation according to various embodiments described above may be implemented in the form of a program code for performing each step and may be stored in a recording medium and distributed. In this case, a device in which the recording medium is mounted may perform the operations such as encryption, ciphertext processing, or the like described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. An electronic apparatus, comprising:
a memory storing at least one instruction; and
a processor to execute the at least one instruction,
wherein the processor, by performing the at least one instruction, is to:
based on receiving an operation command for a homomorphic ciphertext, calculate an operation result using a plaintext corresponding to the homomorphic ciphertext and plaintext operation corresponding to the operation command, predict an operation amount corresponding to the operation command for the homomorphic ciphertext, output the calculated operation result in a scheme corresponding to the operation command, and output the predicted operation amount, and
wherein
the processor determines whether rebooting is necessary in a homomorphic operation process according to the operation command, and based on determination that the rebooting is necessary, predicts an operation amount corresponding to the operation command in consideration of an operation amount necessary for rebooting.

2. The electronic apparatus of claim 1, wherein the memory stores operation capability information of the electronic apparatus, and
wherein the processor calculates time required for performing the operation command using the operation capability information and the predicted operation amount.

3. The electronic apparatus of claim 1, wherein the processor encrypts the operation result in a homomorphic encryption scheme and outputs the encrypted operation result in a scheme corresponding to the operation command.

4. The electronic apparatus of claim 1, wherein the operation command comprises at least one of a homomorphic addition for a plurality of homomorphic ciphertexts, a homomorphic multiplication for a plurality of homomorphic ciphertexts, rotation for one homomorphic ciphertext, or rebooting for one homomorphic ciphertext.

5. The electronic apparatus of claim 1, further comprising:
a display,
wherein the processor, based on an output scheme corresponding to the operation command being displaying, controls the display to display the operation result.

6. The electronic apparatus of claim 1, further comprising:
a communication device,
wherein the processor, based on the output scheme corresponding to the operation command being transmitting to an external device, controls the communication device to transmit the operation result to the external device.

7. The electronic apparatus of claim 1, wherein the processor, based on the output scheme corresponding to the operation command being outputting to another application program, inputs the operation result to the another application program.

8. A method of simulation for a ciphertext by an electronic apparatus, the method comprising:
receiving an operation command for a homomorphic ciphertext;
calculating an operation result using a plaintext corresponding to the homomorphic ciphertext and plaintext operation corresponding to the operation command;
predicting an operation amount corresponding to the operation command for the homomorphic ciphertext;
outputting the predicted operation amount; and
outputting the calculated operation result in a scheme corresponding to the operation command, wherein the predicting the operation amount comprises determining whether rebooting is necessary in a homomorphic operation process according to the operation command, and based on determination that the rebooting is necessary, predicting an operation amount corresponding to the operation command in consideration of an operation amount necessary for rebooting.

9. The method of claim 8, further comprising:

calculating and outputting time required for performing the operation command using prestored operation capability information of the electronic apparatus and the predicted operation amount.

10. The method of claim 8, further comprising:

encrypting the operation result in a homomorphic encryption scheme, wherein the outputting comprises outputting the encrypted operation result in a scheme corresponding to the operation command.

* * * * *